United States Patent
Arreaza et al.

(10) Patent No.: US 11,465,623 B2
(45) Date of Patent: Oct. 11, 2022

(54) SEMI-AUTONOMOUS REVERSING OF A FOLLOWER VEHICLE

(71) Applicant: GM Global Technology Operations LLC, Detroit, MI (US)

(72) Inventors: Carlos E. Arreaza, Oakville (CA); Hojjat Izadi, Toronto (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 35 days.

(21) Appl. No.: 17/088,215

(22) Filed: Nov. 3, 2020

(65) Prior Publication Data

US 2022/0135037 A1    May 5, 2022

(51) Int. Cl.
| | | |
|---|---|---|
| *B60W 30/18* | (2012.01) | |
| *B60W 30/16* | (2020.01) | |
| *B60W 40/105* | (2012.01) | |
| *B60W 40/114* | (2012.01) | |
| *G05D 1/02* | (2020.01) | |
| *H04W 4/46* | (2018.01) | |
| *B60W 40/12* | (2012.01) | |

(52) U.S. Cl.
CPC ...... *B60W 30/18036* (2013.01); *B60W 30/16* (2013.01); *B60W 40/105* (2013.01); *B60W 40/114* (2013.01); *B60W 40/12* (2013.01); *G05D 1/0295* (2013.01); *H04W 4/46* (2018.02); *B60W 2540/18* (2013.01); *B60W 2556/65* (2020.02)

(58) Field of Classification Search
CPC .......... B60W 30/18036; B60W 30/16; B60W 40/105; B60W 40/114; B60W 40/12; B60W 2540/18; B60W 2556/65; G05D 1/0295; H04W 4/46
See application file for complete search history.

(56) References Cited

U.S. PATENT DOCUMENTS

| | | | |
|---|---|---|---|
| 8,116,921 B2* | 2/2012 | Ferrin | G05D 1/0295 701/1 |
| 2010/0049374 A1* | 2/2010 | Ferrin | G05D 1/0227 701/1 |
| 2013/0166157 A1* | 6/2013 | Schleicher | A01D 43/086 701/50 |
| 2020/0057453 A1* | 2/2020 | Laws | G08G 1/22 |
| 2021/0129839 A1* | 5/2021 | Hulten | B62D 6/002 |

FOREIGN PATENT DOCUMENTS

JP    H10100738 A   * 4/1998

OTHER PUBLICATIONS

JP-H10100738-A translation (Year: 1998).*
Equation of a Circle Way Back Machine (Year: 2007).*

* cited by examiner

Primary Examiner — Jeff A Burke
Assistant Examiner — Kyle T Johnson
(74) Attorney, Agent, or Firm — Cantor Colburn LLP

(57) ABSTRACT

Systems and methods for reversing a semi-autonomous follower vehicle involve obtaining a speed of a leader vehicle in front of and unattached to the follower vehicle that is reversing. A method includes estimating a path of the leader vehicle and determining a path for the follower vehicle based on the path of the leader vehicle. A longitudinal movement of the follower vehicle is controlled based on the speed of the leader vehicle and a lateral movement of the follower vehicle is controlled based on the path for the follower vehicle.

18 Claims, 3 Drawing Sheets

SEMI-AUTONOMOUS REVERSING OF A FOLLOWER VEHICLE

INTRODUCTION

The subject disclosure relates to semi-autonomous reversing of a follower vehicle.

In the autonomous vehicle space, platooning refers to a group of vehicles that communicate with each other to form a platoon or flock in which the lead vehicle controls the speed and each of the follower vehicles maintains that speed. This configuration may improve travel time and increase lane capacity, for example. A significant step toward the development of a platoon of autonomous vehicles is a leader-follower configuration. According to the arrangement, a leader vehicle that includes a driver leads a driverless follower vehicle that is semi-autonomous. Accordingly, it is desirable to provide semi-autonomous reversing of a follower vehicle.

SUMMARY

In one exemplary embodiment, a method of reversing a semi-autonomous follower vehicle includes obtaining a speed of a leader vehicle in front of and unattached to the follower vehicle that is reversing and estimating a path of the leader vehicle. The method also includes determining a path for the follower vehicle based on the path of the leader vehicle, and controlling longitudinal movement of the follower vehicle based on the speed of the leader vehicle and lateral movement of the follower vehicle based on the path for the follower vehicle.

In addition to one or more of the features described herein, the method also includes obtaining, by the processor of the follower vehicle, a wheelbase $L_L$ of the leader vehicle and a steering wheel angle $SWA_L$ of the leader vehicle, wherein the obtaining the speed of the leader vehicle, the wheelbase $L_L$ of the leader vehicle, and the steering wheel angle $SWA_L$ of the leader vehicle is via vehicle-to-vehicle (V2V) communication from the leader vehicle.

In addition to one or more of the features described herein, the estimating the path of the leader vehicle includes determining a turning radius R as:

$$R = \frac{L_L}{SWA_L * SGR},$$

where SGR is a steering gear ratio which is a conversion factor between the steering wheel angle $SWA_L$ and a road wheel angle.

In addition to one or more of the features described herein, the estimating the path of the leader vehicle includes generating a trajectory in an x, y coordinate system as:

$$R^2 = x^2 + (y-R)^2.$$

In addition to one or more of the features described herein, the method also includes further comprising determining, using the processor of the follower vehicle, a position of the follower vehicle in the x, y coordinate system as:

$$x_f = \frac{L_f}{2} + d*\sin(\alpha + \Delta Yaw),$$

and $y_f = d*\cos(\alpha + \Delta Yaw)$, where d is a distance between the leader vehicle and the follower vehicle, $\alpha$ is an azimuth angle between the leader vehicle and the follower vehicle, $L_f$ is a wheelbase of the follower vehicle, and $\Delta Yaw$ is a difference between a yaw of the leader vehicle and a yaw of the follower vehicle.

In addition to one or more of the features described herein, the method also includes determining the distance d between the leader vehicle and the follower vehicle and the azimuth angle $\alpha$ between the leader vehicle and the follower vehicle using a sensor of the follower vehicle.

In addition to one or more of the features described herein, the method also includes obtaining the yaw of the leader vehicle via the V2V communication, obtaining the yaw of the follower vehicle via a sensor, and determining the difference $\Delta Yaw$ as the yaw of the leader vehicle subtracted from the yaw of the follower vehicle.

In addition to one or more of the features described herein, the determining the path for the follower vehicle includes computing a steering wheel angle $SWA_F$ of the follower vehicle, the computation including determining yaw of the leader vehicle at a point in the path of the leader vehicle and determining a distance from the follower vehicle to the point in the path of the leader vehicle.

In addition to one or more of the features described herein, the determining the yaw of the leader vehicle at the point in the path of the leader vehicle includes determining an angle between the point in the path of the leader vehicle and a line that is tangent to the path of the leader vehicle at the point.

In addition to one or more of the features described herein, the computing the steering wheel angle $SWA_F$ of the follower vehicle includes using tuning parameters that are a function of speed.

In another exemplary embodiment, a system to perform semi-autonomous reversing includes a leader vehicle to provide, via vehicle-to-vehicle (V2V) communication, a speed of the leader vehicle. The system also includes a processor of a follower vehicle that is not physically coupled to the leader vehicle. The processor estimates a path of the leader vehicle, determines a path for the follower vehicle based on the path of the leader vehicle, and controls longitudinal movement of the follower vehicle based on the speed of the leader vehicle and lateral movement of the follower vehicle based on the path for the follower vehicle.

In addition to one or more of the features described herein, the processor of the follower vehicle obtains a wheelbase $L_L$ of the leader vehicle and a steering wheel angle $SWA_L$ of the leader vehicle via vehicle-to-vehicle (V2V) communication from the leader vehicle.

In addition to one or more of the features described herein, the processor of the follower vehicle estimates the path of the leader vehicle by determining a turning radius R as:

$$R = \frac{L_L}{SWA_L * SGR},$$

where SGR is a steering gear ratio which is a conversion factor between the steering wheel angle $SWA_L$ and a road wheel angle.

In addition to one or more of the features described herein, the processor of the follower vehicle estimates the path of the leader vehicle by generating a trajectory in an x, y coordinate system as:

$$R^2 = x^2 + (y-R)^2.$$

In addition to one or more of the features described herein, the processor of the follower vehicle determines a position of the follower vehicle in the x, y coordinate system as:

$$x_f = \frac{L_f}{2} + d*\sin(\alpha + \Delta Yaw),$$

and $y_f = d*\cos(\alpha + \Delta Yaw)$, where d is a distance between the leader vehicle and the follower vehicle, α is an azimuth angle between the leader vehicle and the follower vehicle, $L_f$ is a wheelbase of the follower vehicle, and ΔYaw is a difference between a yaw of the leader vehicle and a yaw of the follower vehicle.

In addition to one or more of the features described herein, the processor of the follower vehicle determines the distance d between the leader vehicle and the follower vehicle and the azimuth angle α between the leader vehicle and the follower vehicle using a sensor of the follower vehicle.

In addition to one or more of the features described herein, the processor of the follower vehicle obtains the yaw of the leader vehicle via the V2V communication, obtains the yaw of the follower vehicle via a sensor, and determines the difference ΔYaw as the yaw of the leader vehicle subtracted from the yaw of the follower vehicle.

In addition to one or more of the features described herein, the processor of the follower vehicle determines the path for the follower vehicle by computing a steering wheel angle $SWA_F$ of the follower vehicle, the computing including determining yaw of the leader vehicle at a point in the path of the leader vehicle and determining a distance from the follower vehicle to the point in the path of the leader vehicle.

In addition to one or more of the features described herein, the processor of the follower vehicle determines the yaw of the leader vehicle at the point in the path of the leader vehicle by determining an angle between the point in the path of the leader vehicle and a line that is tangent to the path of the leader vehicle at the point.

In addition to one or more of the features described herein, the processor of the follower vehicle computes the steering wheel angle $SWA_F$ of the follower vehicle by using tuning parameters that are a function of speed.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
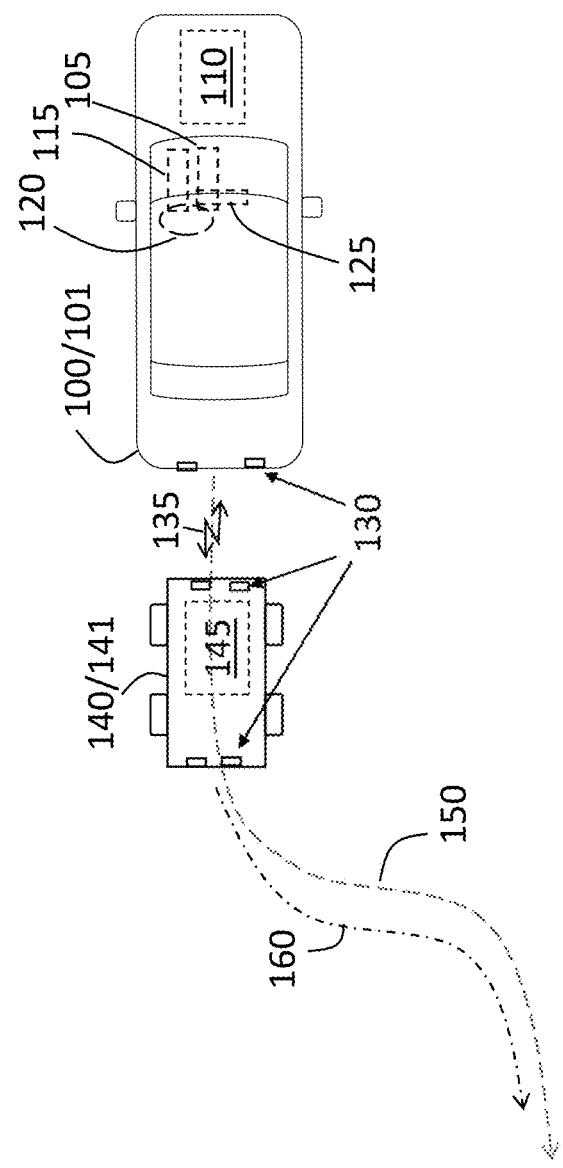
FIG. 1 illustrates semi-autonomous reversing of a follower vehicle according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a leader-follower configuration involves a leader vehicle with a driver and a semi-autonomous, driverless follower vehicle. Embodiments of the systems and methods detailed herein relate to semi-autonomous reversing of a follower vehicle. The follower vehicle may be a trailer that accommodates another vehicle (e.g., boat, other watercraft, all-terrain vehicle), a travel trailer, or other driverless platform that may previously have been physically towed by the leader vehicle. When the follower vehicle is following the leader vehicle, the follower vehicle maintains a prescribed distance behind the leader vehicle and a prescribed azimuthal or lateral deviation on the path created by the leader vehicle. The follower vehicle maintains the requisite distance and path based on line-of-sight between sensors of both the leader vehicle and the follower vehicle and without any physical connection between the two.

Based on this configuration, the follower vehicle actually moves ahead of the leader vehicle during a reversing maneuver. Thus, the follower vehicle must anticipate and match the movement of the leader vehicle, according to embodiments detailed herein. The follower vehicle must match the longitudinal movement (i.e., speed) of the leader vehicle to the extent that a minimum distance is maintained between the two. This may be facilitated by vehicle-to-vehicle (V2V) communication between the leader vehicle and the follower vehicle or by an estimation of the speed of the leader vehicle by the follower vehicle according to exemplary embodiments. The follower vehicle must also match the lateral movement of the leader vehicle in order to avoid a jack-knifing scenario (i.e., the leader vehicle and follower vehicle form an acute angle) or other event that causes the line of sight between the sensors of the two vehicles to be lost. This may be facilitated by V2V communication of the steering angle of the leader vehicle. The steering angle is used by the follower vehicle to estimate a path of the leader vehicle and to calculate a corresponding path for the follower vehicle as detailed according to one or more embodiments.

In accordance with an exemplary embodiment, FIG. 1 illustrates semi-autonomous reversing of a follower vehicle 140 according to one or more embodiments. A leader vehicle 100 and a follower vehicle 140 are shown. The exemplary leader vehicle 100 shown in FIG. 1 is an automobile 101, but the leader vehicle 100 may be a truck, farm equipment, construction equipment, or any conveyance with a driver, according to alternate embodiments. The exemplary follower vehicle 140 shown in FIG. 1 is a travel trailer 141 but, as previously noted, the follower vehicle 140 may alternately be any type of driverless vehicle that may have been physically towed prior to the leader-follower configuration.

The leader vehicle 100 and the follower vehicle 140 include sensors 130 that obtain information about the environment around the vehicles 100, 140 and that provide information about the vehicle 100, 140 itself. Exemplary sensors 130 include cameras, lidar systems, radar systems, ultrasonic sensors, a global navigation satellite system such as a global positioning system, an inertial measurement unit, gyroscope, and wheel speed sensors. According to one or more embodiments, the sensors 130 relevant to lateral control of the follower vehicle 140, as detailed, include a yaw sensor in each of the vehicles 100, 140 and a steering wheel angle sensor in at least the vehicle 100. According to an exemplary embodiment, sensors 130 are indicated on the back of the leader vehicle 100 and on both ends of the follower vehicle 140. However, the numbers and locations of the sensors 130 on either the leader vehicle 100 or the follower vehicle 140 are not limited by the exemplary illustration. The leader vehicle 100 includes an interface 125 with the driver. For example, the interface 125 may be part of the infotainment system that includes a display screen and provides a touchscreen or other input device to the driver.

The leader vehicle 100 includes an accelerator pedal 105, a brake pedal 115, and a steering wheel 120, all of which are operated by a driver of the leader vehicle 100. While pedals 105, 115 are shown and discussed for explanatory purposes, knobs, levers, or other control mechanisms may be employed to serve the same functions according to alternate embodiments. The leader vehicle 100 includes a controller 110 that, alone or in combination with other processing circuitry, controls aspects of the operation and communication of the leader vehicle 100. For example, the leader vehicle 100 and the follower vehicle 140 may perform vehicle-to-vehicle (V2V) communication, exchanging V2V messages 135. As detailed with reference to FIG. 2, the V2V communication from the leader vehicle 100 may indicate the speed of the leader vehicle 100 and movement of the steering wheel 120. V2V communication from the follower vehicle 140 to the leader vehicle 100 may provide data (e.g., images) obtained with one or more of its sensors 130 (e.g., cameras). Images obtained by the leader vehicle 100 from the follower vehicle 140 may be displayed by the interface 125 (e.g., infotainment screen) to the driver of the leader vehicle 100, for example.

The follower vehicle 140 is shown to include a controller 145. The controller 145 of the follower vehicle 140 facilitates V2V communication with the leader vehicle 100. This communication may indicate information that the leader vehicle 100 cannot easily obtain on its own. For example, because the follower vehicle 140 is ahead of the leader vehicle 100 in the reversing configuration, the sensors 130 of the follower vehicle 140 may detect an object (e.g., pedestrian, other vehicle, wall) that is not yet visible to the sensors 130 of the leader vehicle 100. The follower vehicle 140 may warn the leader vehicle 100, via V2V communication, that the follower vehicle 140 will contact the object if the reversing is continued. In addition, the follower vehicle 140 may warn the leader vehicle 100 about a potential jackknifing scenario (i.e., leader vehicle 100 and follower vehicle 140, together, form an acute angle). That is, the controller 145 of the follower vehicle 140 monitors the angle formed by the combination of the leader vehicle 100 and the follower vehicle 140. This monitoring may be based on the estimated path 150 of the leader vehicle 100 and the calculated path 160 of the follower vehicle 140 discussed below. If the angle is decreasing and reaches a predefined threshold value, then the follower vehicle 140 may issue a warning to the leader vehicle 100 via V2V communication.

In addition to facilitating V2V communication with the leader vehicle 100, the controller 145 of the follower vehicle 140 may also perform and control implementation of the longitudinal control and lateral control (e.g., path planning) that is discussed with reference to FIG. 2. Specifically, in addition to obtaining or estimating the speed of the leader vehicle 100, the controller 145 of the follower vehicle 140 may estimate the path 150 of the leader vehicle 100 in order to calculate a path 160 for the follower vehicle 140. Both the controller 110 of the leader vehicle 100 and the controller 145 of the follower vehicle 140 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
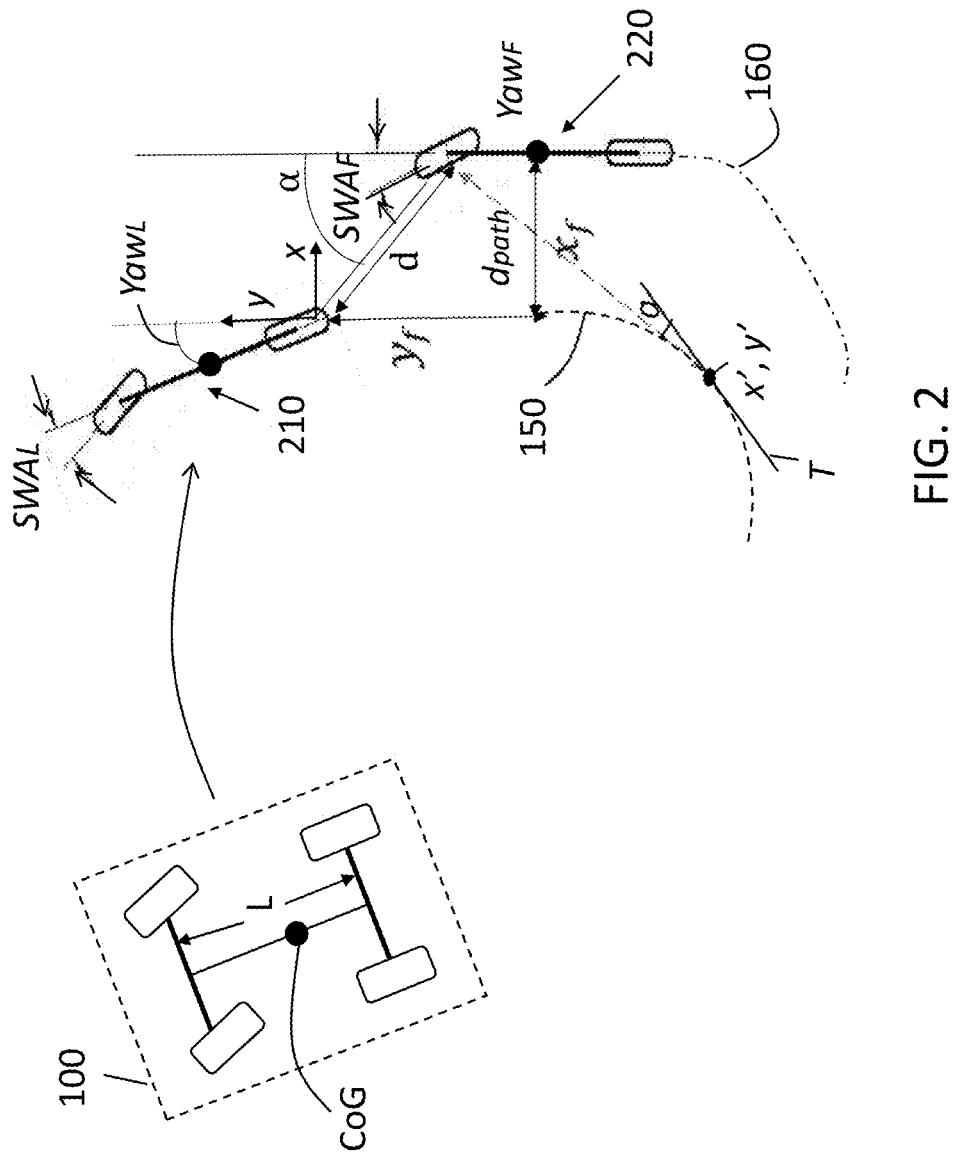
FIG. 2 shows parameters used in performing path planning for semi-autonomous reversing of a follower vehicle according to one or more embodiments.

FIG. 2 shows parameters used in performing path planning for semi-autonomous reversing of a follower vehicle 140 according to one or more embodiments. A coordinate system x, y is selected, as indicated in FIG. 2. This specific coordinate system could instead be that of one of the vehicles 100, 140, at the center of gravity (CoG) of one of the vehicles 100, 140 or elsewhere, or may be selected according to another basis, but the point is to have a common coordinate system in considering all the positions, as detailed.

According to an exemplary embodiment, a vehicle bicycle model is generated for the leader vehicle 100 as a leader bicycle model 210 and for the follower vehicle 140 as a follower bicycle model 220. Other models may be used for the path 150, 160 determination according to alternate embodiments. The vehicle bicycle model is a known kinematic model that represents the four wheels with two wheels that include a steerable front wheel representing the two front wheels and a non-steerable back wheel representing the two back wheels of the vehicle. The wheelbase L, which is the distance between the front and rear tires, is used in the bicycle model, but the track width, which is the distance between the two front or two rear wheels (i.e., length of the front or rear axle), is usually not part of the model. The steering angle of the front wheel in a bicycle model is the average of the angles between the left and right wheels from the actual vehicle. In the equations to follow, $L_L$ if the wheelbase of the leader vehicle 100, and $L_F$ is the wheelbase of the follower vehicle 140. Both wheelbase values $L_L$ and $L_F$ are provided to the controller 145 of the follower vehicle 140.

Yaw refers to a shift (to the left or right) in orientation a vehicle from a reference orientation. The yaw angles of the leader vehicle 100 and the follower vehicle 140, respectively, are $Yaw_L$ and $Yaw_F$. As previously noted, sensors 130 at the leader vehicle 100 and follower vehicle 140 provide the yaw angles. In addition, V2V communication is used to report the yaw angle of the leader vehicle 100 $Yaw_L$ to the controller 145 of the follower vehicle 140. The yaw angles $Yaw_L$ and $Yaw_F$ are converted to the x, y coordinate system, as shown. In the exemplary case, the yaw angle of the follower vehicle 140 $Yaw_F$ in the x, y coordinate system is 0. The difference, ΔYaw is:

$$\Delta Yaw = Yaw_F - Yaw_L \qquad [EQ. 1]$$

As previously noted, in addition to the yaw angle of the leader vehicle 100 $Yaw_L$, the steering wheel angle of the leader vehicle 100 $SWA_L$ is also obtained via V2V communication by the controller 145 of the follower vehicle 140. Based on this angle and the wheelbase of the leader vehicle 100 $L_L$, the controller 145 determines the turning radius R of the leader vehicle 100 using the leader bicycle model 210 as:

$$R = \frac{L_L}{SWA_L * SGR} \qquad [EQ. 2]$$

In EQ. 2, the steering gear ratio (SGR) is a conversion factor between the steering wheel angle of the leader vehicle 100 $SWA_L$ and the road wheel angle (i.e., angle of the front wheel of the leader bicycle model 210). Then the trajectory (i.e., estimated path 150) of the leader vehicle 100 is estimated, in the x and y coordinate system, according to the formula for a circle:

$$R^2 = x^2 + (y-R)^2 \quad \text{[EQ. 3]}$$

That is, once the turning radius R of the leader vehicle 100 is determined based on its steering wheel angle $SWA_L$, the trajectory for the path 150 may be estimated according to EQ. 3. This is updated every time the steering wheel angle of the leader vehicle 100 $SWA_L$ changes. Similarly, the difference $\Delta Yaw$ is updated according to EQ. 1.

As previously noted, whether reversing or following, the follower vehicle 140 maintains a prescribed distance d from the leader vehicle 100 and a prescribed azimuthal or lateral deviation (angle α) from the leader vehicle 100. The follower vehicle 140 may use sensors 130 (e.g., lidar system) to determine its distance d and azimuth angle α from the leader vehicle 100. As shown in FIG. 2, the azimuth angle α is between they axis (orientation of the follower vehicle in FIG. 2) and a line between the frontal midpoint of the follower bicycle model 220 and rear midpoint of the leader bicycle model 210. Based on this distance d and azimuth angle α, the position of the follower vehicle 140 in the x, y coordinate system may be determined as:

$$x_f = \frac{L_f}{2} + d*\sin(\alpha + \Delta Yaw) \quad \text{[EQ. 4]}$$

$$y_f = d*\cos(\alpha + \Delta Yaw) \quad \text{[EQ. 5]}$$

In FIG. 2, the distance d is shown from the rear wheel of the leader bicycle model 210 to the front wheel of the follower bicycle model 220 and the position $x_f$, $y_f$ of the follower bicycle model 220 is at the COG of the follower bicycle model 220. However, this exemplary embodiment is not intended to be limiting. The position $x_f$, $y_f$ of the follower bicycle model 220 may instead be the front or rear wheel of the follower bicycle model 220 and the distance d may instead be from a different part of the leader bicycle model 210 to a different part of the follower bicycle model 220. The equations according to one or more embodiments will facilitate lateral control of the follower vehicle 140 based on any of the alternate embodiments. Generally, sensors 130 (e.g., lidar system, cameras) on the leader vehicle 100 and on the follower vehicle 140 that face each other (e.g., the back of the leader vehicle 100 and the front of the follower vehicle 140) determine distance d therebetween.

During the reversing process, the steering wheel angle of the follower vehicle 140 $SWA_F$, which controls lateral movement of the follower vehicle 140, may be determined as:

$$SWA_F = k1*(Yaw_F - Yaw_{path}) + \arctan\left(k2*\frac{d_{path}}{speed}\right) \quad \text{[EQ. 6]}$$

In alternate embodiments, the steering wheel angle of the follower vehicle 140 $SWA_F$ may be calculated using another known approach such as pure pursuit. The speed in EQ. 6 refers to the speed of the leader vehicle 100, which is provided to the controller 145 of the follower vehicle 140 via V2V communication based on the speedometer of the leader vehicle 100 or determined by one or more sensors 130 of the follower vehicle 140 according to alternate embodiments.

The yaw of the path 150 $Yaw_{path}$ refers to the yaw of the leader vehicle 100 at a point x', y' ' on the path 150 as it travels the path 150. The yaw of the path 150 $Yaw_{path}$ is obtained as an angle α between a tangent line T to the circle that defines the path 150 according to EQ. 3 at the point x', y', which is normally the closest point of the path 150 to the follower vehicle 140. This point x', y' along the path 150 may be obtained from EQ. 3 by setting y'=$y_f$ (i.e., putting the leader vehicle 100 farther back on the path 150 at the location of the follower vehicle 140) to solve for x', for example. The distance to the path 150 $d_{path}$ is the distance from the position $x_f$, $y_f$ of the follower vehicle 140 to the path 150 defined by the circle in EQ. 3. That is, the distance to the path 150 $d_{path}$ is the distance from the position $x_f$, $y_f$ to a point x', y' on the path 150 (i.e., on the circle defined by EQ. 3). In EQ. 6, k1 and k2 are tuning parameters. Specifically, k1 and k2 are both functions of speed and also depend on the kinematics and dynamics of the follower vehicle 140. These values may be determined through testing, for example, to obtain a specific response of the controller 145 of the follower vehicle 140 (i.e., to correct lateral offset error within a predefined time).

The steering wheel angle of the follower vehicle 140 $SWA_F$ obtained according to EQ. 6 provides the path 160 of the follower vehicle 140 based on EQS. 2 and 3. That is, the turning radius of the follower vehicle 140 is obtained using the wheelbase of the follower vehicle 140 $L_F$ and the steering wheel angle of the follower vehicle 140 $SWA_F$ in EQ. 2. The equation for the path 160 can then be obtained using EQ. 3.

Figure 3:
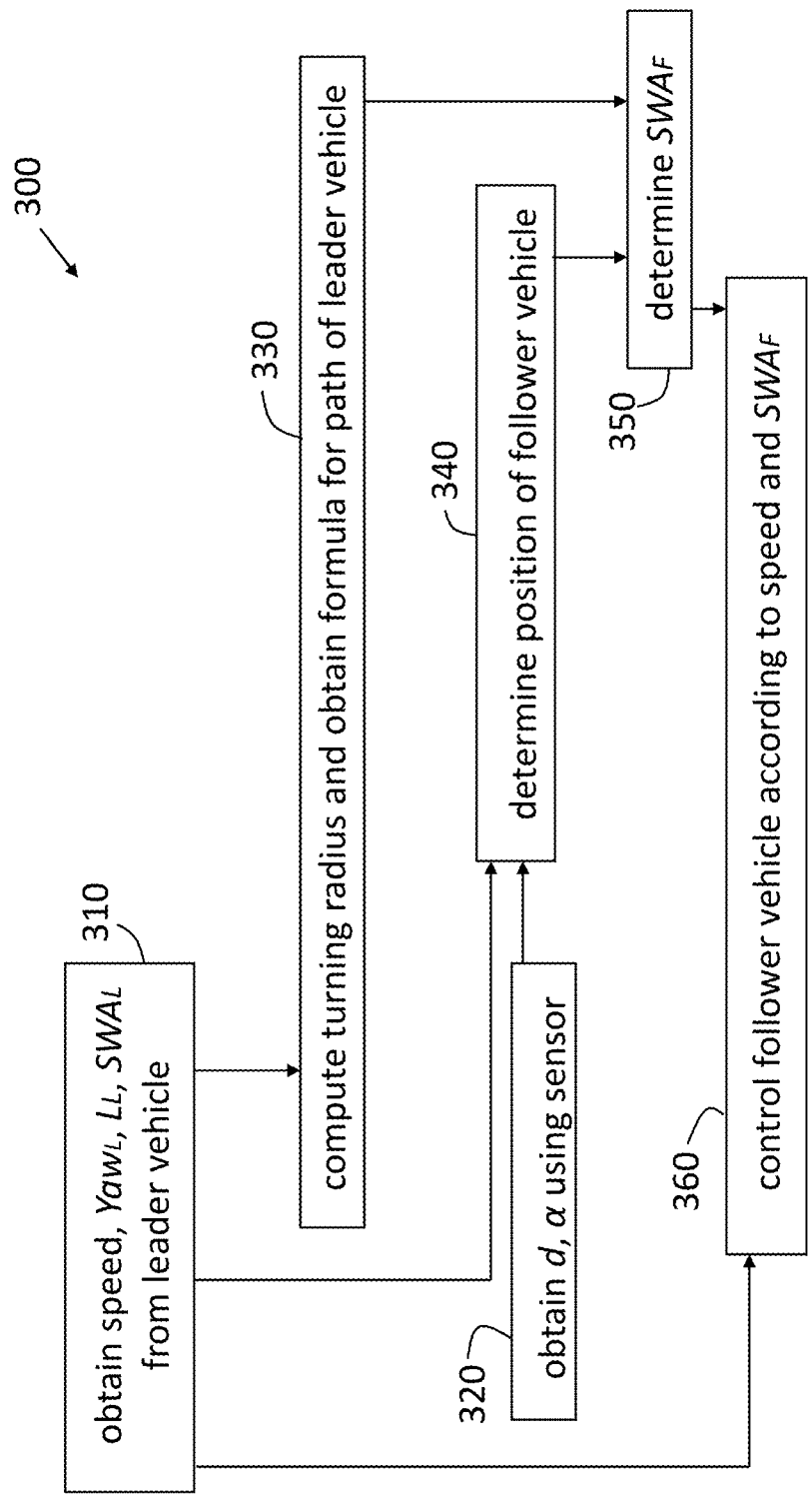
FIG. 3 is a process flow of a method of reversing a follower vehicle according to one or more embodiments.

FIG. 3 is a process flow of a method 300 of reversing a follower vehicle 140 according to one or more embodiments. At block 310, the controller 145 of the follower vehicle 140 obtains information about the leader vehicle 100. The information may be obtained via V2V communication, for example. The information includes speed, yaw of the leader vehicle 100 $Yaw_L$, wheelbase of the leader vehicle $L_L$, and steering wheel angle of the leader vehicle 100 $SWA_L$. At block 320, the follower vehicle 140 determines the distance d to the leader vehicle 100 and the angle α from the leader vehicle 100. This determination may be repeated periodically, for example. As previously noted, this information may be obtained via a sensor 130 (e.g., lidar system) of the follower vehicle 140.

At block 330, computing the turning radius R and obtaining the formula for the path 150 of the leader vehicle 100 is according to EQS. 2 and 3. At block 340, determining the position $x_f$, $y_f$ of the follower vehicle 140 is in the same coordinate system x, y used to determine the path 150 of the leader vehicle 100. This determination uses EQS. 4 and 5. At block 350, determining the steering wheel angle of the follower vehicle 140 $SWA_F$ is according to EQ. 6. At block 360, controlling the follower vehicle 140 during the reversing process is according to the speed of the leader vehicle 100 and the steering wheel angle of the follower vehicle 140 $SWA_F$. The speed of the follower vehicle 140 will be set to closely match the speed of the leader vehicle 100. Specifically, the speed of the follower vehicle 140 may be set to a predefined amount below the speed of the leader vehicle 100 or may be maintained within a threshold range of the speed of the leader vehicle 100, for example.

The method 300 detailed in FIG. 3 represents a semi-autonomous reversing process because the controller 145 of the follower vehicle 100 uses information from the leader vehicle 100 to ultimately reverse the follower vehicle 140. The processes 310 through 360 are repeated during the process of reversing the leader vehicle 100 and the follower vehicle 140. This repetition may be event-based or periodic according to alternate embodiments. For example, a change in one of the values (e.g., a V2V message from the leader vehicle 100 reporting a different steering wheel angle of the leader vehicle 100 $SWA_L$, determination of a different distance d) may trigger re-execution of the processes shown in FIG. 3. Alternately, all the values at blocks 310 and 320 may be obtained and the determinations may be repeated periodically.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of reversing a semi-autonomous follower vehicle, the method comprising:
   obtaining, by a processor of the follower vehicle, a speed of a leader vehicle in front of and unattached to the follower vehicle that is reversing;
   estimating, by the processor of the follower vehicle, a path of the leader vehicle;
   determining, by the processor of the follower vehicle, a path for the follower vehicle based on the path of the leader vehicle;
   controlling, via the processor of the follower vehicle, longitudinal movement of the follower vehicle based on the speed of the leader vehicle and lateral movement of the follower vehicle based on the path for the follower vehicle; and
   obtaining, by the processor of the follower vehicle, a wheelbase $L_L$ of the leader vehicle and a steering wheel angle $SWA_L$ of the leader vehicle, wherein the obtaining the speed of the leader vehicle, the wheelbase $L_L$ of the leader vehicle, and the steering wheel angle $SWA_L$ of the leader vehicle is via a vehicle-to-vehicle (V2V) communication from the leader vehicle, wherein the estimating the path of the leader vehicle includes determining a turning radius R and generating a trajectory in an x, y coordinate system, and the method also includes determining, using the processor of the follower vehicle, a position of the follower vehicle in the x, y coordinate system.

2. The method according to claim 1, wherein the estimating the path of the leader vehicle includes determining the turning radius R as:

$$R = \frac{L_L}{SWA_L * SGR},$$

where SGR is a steering gear ratio which is a conversion factor between the steering wheel angle $SWA_L$ and a road wheel angle.

3. The method according to claim 2, wherein the estimating the path of the leader vehicle includes generating the trajectory in the x, y coordinate system as:

$$R^2 = x^2 + (y-R)^2.$$

4. The method according to claim 3, further comprising determining, using the processor of the follower vehicle, the position of the follower vehicle in the x, y coordinate system as:

$$x_f = \frac{L_f}{2} + d * \sin(\alpha + \Delta Yaw),$$

and $$y_f = d * \cos(\alpha + \Delta Yaw), \text{ where}$$

d is a distance between the leader vehicle and the follower vehicle, $\alpha$ is an azimuth angle between the leader vehicle and the follower vehicle, $L_f$ is a wheelbase of the follower vehicle, and $\Delta Yaw$ is a difference between a yaw of the leader vehicle and a yaw of the follower vehicle.

5. The method according to claim 4, further comprising determining the distance d between the leader vehicle and the follower vehicle and the azimuth angle $\alpha$ between the leader vehicle and the follower vehicle using a sensor of the follower vehicle.

6. The method according to claim 4, further comprising obtaining the yaw of the leader vehicle via the V2V communication, obtaining the yaw of the follower vehicle via a sensor, and determining the difference $\Delta Yaw$ as the yaw of the leader vehicle subtracted from the yaw of the follower vehicle.

7. The method according to claim 4, wherein the determining the path for the follower vehicle includes computing a steering wheel angle $SWA_F$ of the follower vehicle, the computation including determining yaw of the leader vehicle at a point in the path of the leader vehicle and determining a distance from the follower vehicle to the point in the path of the leader vehicle.

8. The method according to claim 7, wherein the determining the yaw of the leader vehicle at the point in the path of the leader vehicle includes determining an angle between the point in the path of the leader vehicle and a line that is tangent to the path of the leader vehicle at the point.

9. The method according to claim 7, wherein the computing the steering wheel angle $SWA_F$ of the follower vehicle includes using tuning parameters that are a function of speed.

10. A system to perform semi-autonomous reversing, the system comprising:
    a leader vehicle configured to provide, via a vehicle-to-vehicle (V2V) communication, a speed of the leader vehicle; and
    a processor of a follower vehicle that is not physically coupled to the leader vehicle and is configured to estimate a path of the leader vehicle, determine a path for the follower vehicle based on the path of the leader vehicle, and control longitudinal movement of the follower vehicle based on the speed of the leader vehicle and lateral movement of the follower vehicle based on the path for the follower vehicle, wherein the processor of the follower vehicle is configured to obtain a wheelbase $L_L$ of the leader vehicle and a steering wheel angle $SWA_L$ of the leader vehicle via vehicle-to-vehicle (V2V) communication from the leader vehicle, to estimate the path of the leader vehicle by determining a turning radius R, to estimate the path of the leader vehicle by generating a trajectory in an x, y coordinate system, and to determine a position of the follower vehicle in the x, y coordinate system.

11. The system according to claim 10, wherein the processor of the follower vehicle is configured to estimate the path of the leader vehicle by determining the turning radius R as:

$$R = \frac{L_L}{SWA_L * SGR},$$

where SGR is a steering gear ratio which is a conversion factor between the steering wheel angle $SWA_L$ and a road wheel angle.

12. The system according to claim 11, wherein the processor of the follower vehicle is configured to estimate the path of the leader vehicle by generating the trajectory in the x, y coordinate system as:

$$R^2 = x^2 + (y-R)^2.$$

13. The system according to claim 12, the processor of the follower vehicle is configured to determine the position of the follower vehicle in the x, y coordinate system as:

$$x_f = \frac{L_f}{2} + d * \sin(\alpha + \Delta Yaw),$$

and $y_f = d * \cos(\alpha + \Delta Yaw)$, where d is a distance between the leader vehicle and the follower vehicle, $\alpha$ is an azimuth angle between the leader vehicle and the follower vehicle, $L_f$ is a wheelbase of the follower vehicle, and $\Delta Yaw$ is a difference between a yaw of the leader vehicle and a yaw of the follower vehicle.

14. The system according to claim 13, wherein the processor of the follower vehicle is configured to determine the distance d between the leader vehicle and the follower vehicle and the azimuth angle $\alpha$ between the leader vehicle and the follower vehicle using a sensor of the follower vehicle.

15. The system according to claim 13, wherein the processor of the follower vehicle is configured to obtain the yaw of the leader vehicle via the V2V communication, to obtain the yaw of the follower vehicle via a sensor, and to determine the difference $\Delta Yaw$ as the yaw of the leader vehicle subtracted from the yaw of the follower vehicle.

16. The system according to claim 13, wherein the processor of the follower vehicle is configured to determine the path for the follower vehicle by computing a steering wheel angle $SWA_F$ of the follower vehicle, the computing including determining yaw of the leader vehicle at a point in the path of the leader vehicle and determining a distance from the follower vehicle to the point in the path of the leader vehicle.

17. The system according to claim 16, wherein the processor of the follower vehicle is configured to determine the yaw of the leader vehicle at the point in the path of the leader vehicle by determining an angle between the point in the path of the leader vehicle and a line that is tangent to the path of the leader vehicle at the point.

18. The system according to claim 16, wherein the processor of the follower vehicle is configured to compute the steering wheel angle $SWA_F$ of the follower vehicle by using tuning parameters that are a function of speed.

* * * * *